United States Patent [19]

Hively

[11] Patent Number: 5,511,537
[45] Date of Patent: Apr. 30, 1996

[54] SMART, PASSIVE SUN FACING SURFACES

[75] Inventor: Lee M. Hively, Knoxville, Tenn.

[73] Assignee: Martin Marietta Energy Systems, Inc., Oak Ridge, Tenn.

[21] Appl. No.: 241,983

[22] Filed: May 12, 1994

[51] Int. Cl.⁶ ........................................................ F24J 2/00
[52] U.S. Cl. ........................ 126/702; 126/600; 126/621; 126/633; 126/701
[58] Field of Search ............................. 126/702, 701, 126/633, 621, 600

[56] References Cited

U.S. PATENT DOCUMENTS

| 246,626 | 9/1881 | Morse | 126/633 X |
|---|---|---|---|
| 4,084,578 | 4/1978 | Ishibashi | 126/640 X |
| 4,119,863 | 10/1978 | Kelly | 290/55 |
| 4,141,340 | 2/1979 | Niedermeyer | 126/271 |
| 4,142,510 | 3/1979 | Hare et al. | 126/271 |
| 4,223,662 | 9/1980 | Lunde et al. | 126/424 |
| 4,274,396 | 6/1981 | Peters et al. | 126/438 |
| 4,296,733 | 10/1981 | Saunders | 126/633 X |
| 4,307,709 | 12/1981 | Sletten et al. | 126/440 |
| 4,323,054 | 4/1982 | Hummel | 126/449 |
| 4,337,754 | 7/1982 | Conger | 126/701 X |
| 4,370,974 | 2/1983 | Maxey | 126/685 X |
| 4,398,530 | 8/1983 | Saunders | 126/685 X |
| 4,401,105 | 8/1983 | McAlister | 126/422 |
| 4,410,757 | 10/1983 | Stamminger et al. | 126/701 X |
| 4,423,718 | 1/1984 | Garrison | 126/438 |
| 4,484,566 | 11/1984 | Gonzalez | 126/429 |
| 4,488,540 | 12/1984 | McAlister | 126/438 |
| 4,492,424 | 1/1985 | Clegg | 350/96.10 |
| 4,513,734 | 4/1985 | Butler | 126/687 X |
| 4,534,336 | 8/1985 | Ladriere | 126/633 |
| 4,715,358 | 12/1987 | Köster | 126/702 |
| 4,750,473 | 6/1988 | Dunn | 126/633 X |

FOREIGN PATENT DOCUMENTS

354916  7/1961  Switzerland ........................... 126/702

Primary Examiner—Larry Jones
Attorney, Agent, or Firm—J. A. Marasco; J. K. Davis; H. W. Adams

[57] ABSTRACT

An article adapted for selectively utilizing solar radiation comprises an absorptive surface and a reflective surface, the absorptive surface and the reflective surface oriented to absorb solar radiation when the sun is in a relatively low position, and to reflect solar radiation when the sun is in a relatively high position.

8 Claims, 9 Drawing Sheets

SMART, PASSIVE SUN FACING SURFACES

The United States Government has rights in this invention pursuant to contract no. DE-AC05-84OR21400 between the United States Department of Energy and Martin Marietta Energy Systems, Inc.

FIELD OF THE INVENTION

The present invention relates to solar surface structures, defined as surface structures adapted for utilizing solar radiation, and more particularly to solar surface structures adapted for passive solar heating during winter seasons, involving absorption of solar radiation, and passive solar cooling during summer seasons, involving reflection of solar radiation.

BACKGROUND OF THE INVENTION

Passive solar energy heating and cooling for buildings is generally considered to be desirable for efficiency and low cost. However, since available solar infrared radiation intensity can vary greatly at any given geographical location over daily and annual cycles, the efficiency of such systems generally lowers cost effectiveness thereof. Conventional heating and cooling costs can be substantially reduced by smart, passive solar building surface structures which automatically and passively adjust to variations in available solar radiation intensity.

Conventional passive solar systems typically include macrostructure design features such as large roof overhangs to shade the solar sides of buildings during summer and to allow direct solar heating thereof during winter. However, such features usually involve excess space and structural support requirements, and usually are not effective enough to warrant the cost.

Large deciduous trees are utilized to shade the solar sides and roof during the summer and to allow solar heating thereof in winter after the leaves fall. Large evergreen trees are employed on the north sides of building as wind breaks. However, trees take many years to grow large enough to be effective, and are subject to well known disadvantages and problems associated with trees.

Other conventional systems include reflective, solar-facing surfaces are used to reject summer heat. Insulated outer surfaces, walls and ceilings reduce summer solar heating and reduce winter heat loss. Earth sheltered and underground buildings provide large heat capacities and high insulation against hot summers and cold winters.

OBJECTS OF THE INVENTION

Accordingly, objects of the present invention include the provision of solar surface structures which provide advantages which include: solar radiation absorptivity enhancement and increased solar radiation retention (thermal absorptivity enhancement) during winter; solar radiation reflectivity enhancement and reduced absorption of scattered summer solar radiation during summer; thermal emissivity reduction during cold weather; adaptability to vertical/inclined walls and to inclined/horizontal roof surfaces; and adaptability to surface panel installation in order to retrofit existing energy-inefficient buildings.

Further and other objects of the present invention will become apparent from the description contained herein.

SUMMARY OF THE INVENTION

In accordance with one aspect of the present invention, the foregoing and other objects are achieved by an article adapted for selectively utilizing solar radiation which comprises an absorptive surface and a reflective surface, the absorptive surface and the reflective surface oriented to absorb solar radiation when the sun is in a relatively low position, and to reflect solar radiation when the sun is in a relatively high position.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1A:
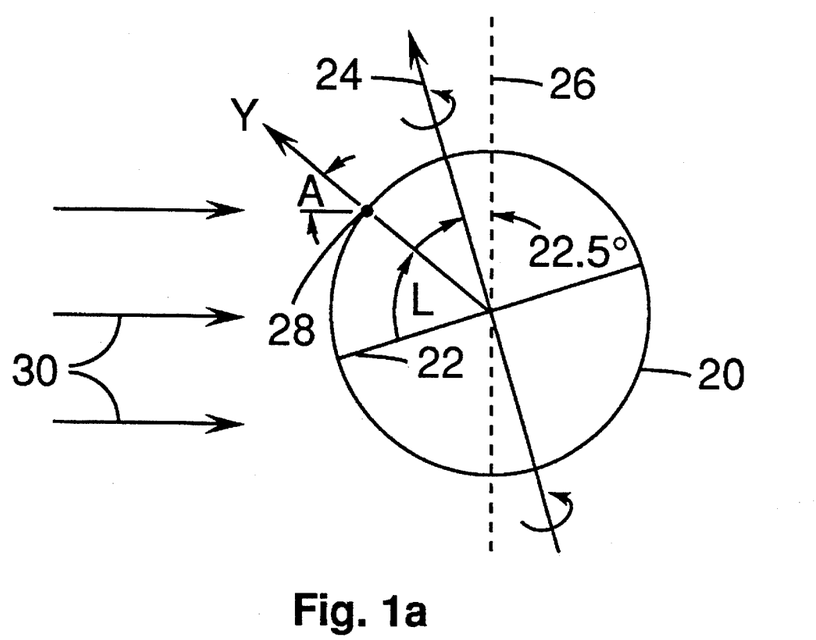
FIG. 1a illustrates earth and angle A between local vertical at latitude L and the direction of noon solar radiation at summer solstice, where A=L−22.5°.
Figure 1B:
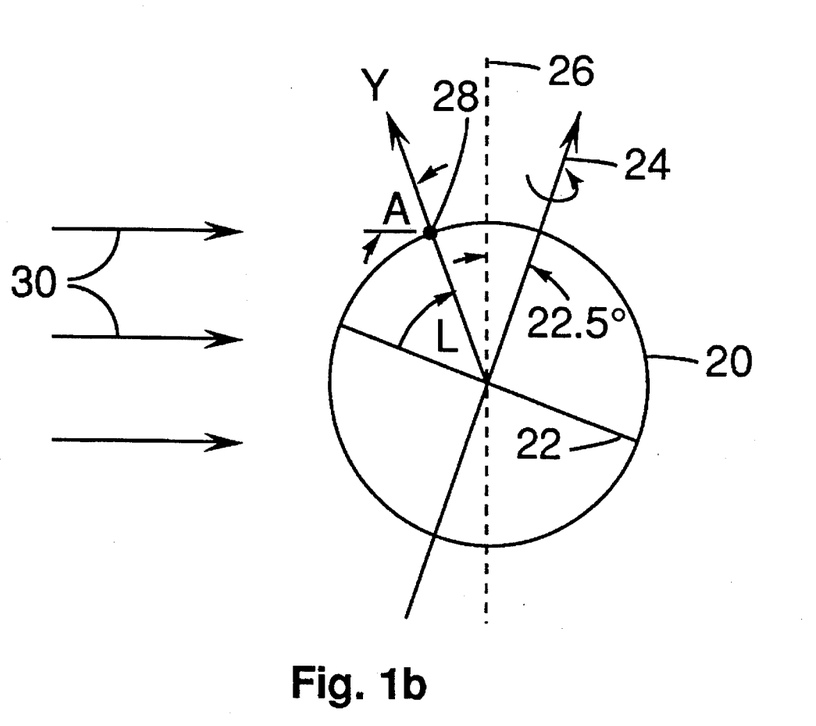
FIG. 1b illustrates, cross sectionally, earth and angle A between local vertical at latitude L and the direction of noon solar radiation at winter solstice, where A=L+22.5°.

This invention involves the design of easily installed surfaces (e.g., panels, walls and roofs) having structural surface features adapted for smart, passive solar heating and cooling. With reference to FIGS. 1a and 1b, earth 20 is characterized by equator 22 and rotational axis 24 which, relative to the plane of earth's orbit, is tilted 22.5° from normal, represented by dotted line 26. Consider a building located at a specific point 28. Direct solar radiation 30 has a local noon angle of incidence A relative to the local vertical direction Y, A=L±22.5°, where L is the latitude of the building, and the (±) sign applies to summer/winter solstice, respectively.

In the figures, equivalent elements are identified by like identification symbols. Moreover, the description of the invention illustrates typical midsummer and midwinter conditions which gradually change with seasonal cycles.

In the present invention, the conventional practice of using a massive roof overhang for passive heating and shading of a surface is reduced to many small overhangs that cover a surface. Such overhangs can range in size from several inches to microscopic, and can vary greatly in construction, as will be shown hereinbelow.

Figure 2A:
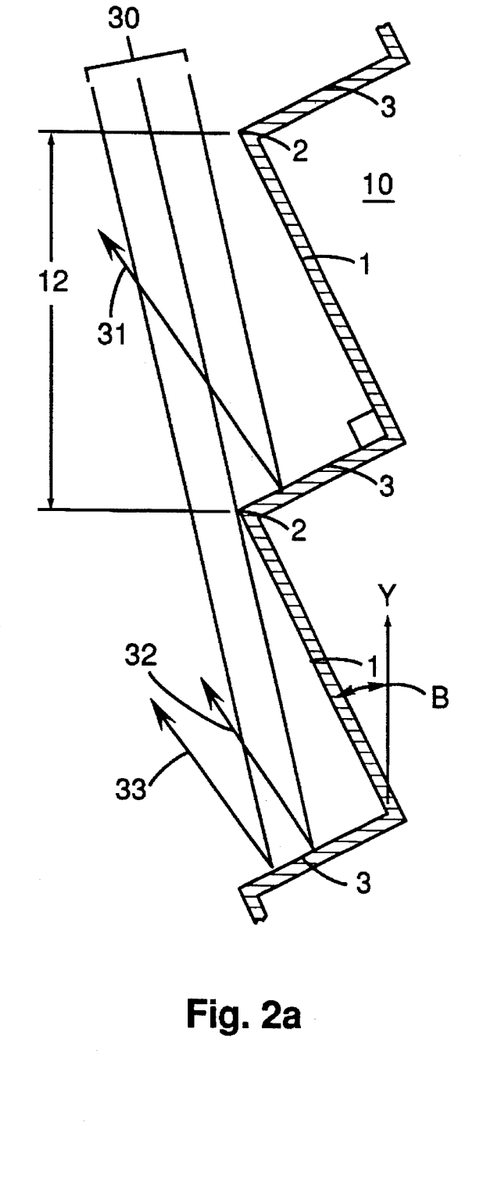
FIGS. 2a and 2b illustrate, in side cross sectional views, an embodiment of the invention as applied to a vertical surface, shown in summer and winter, respectively.
Figure 2B:
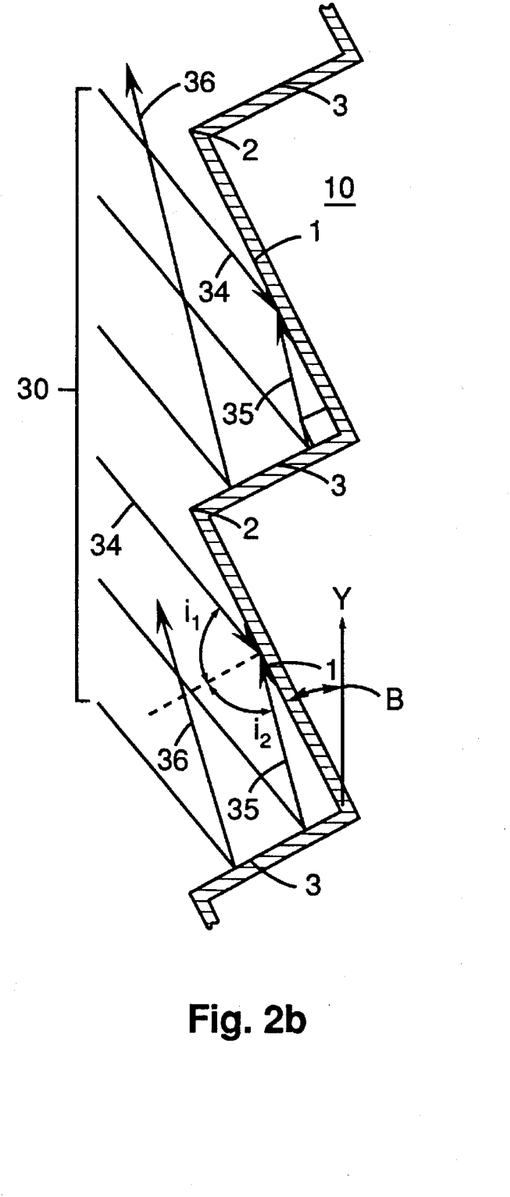
Figure 2C:
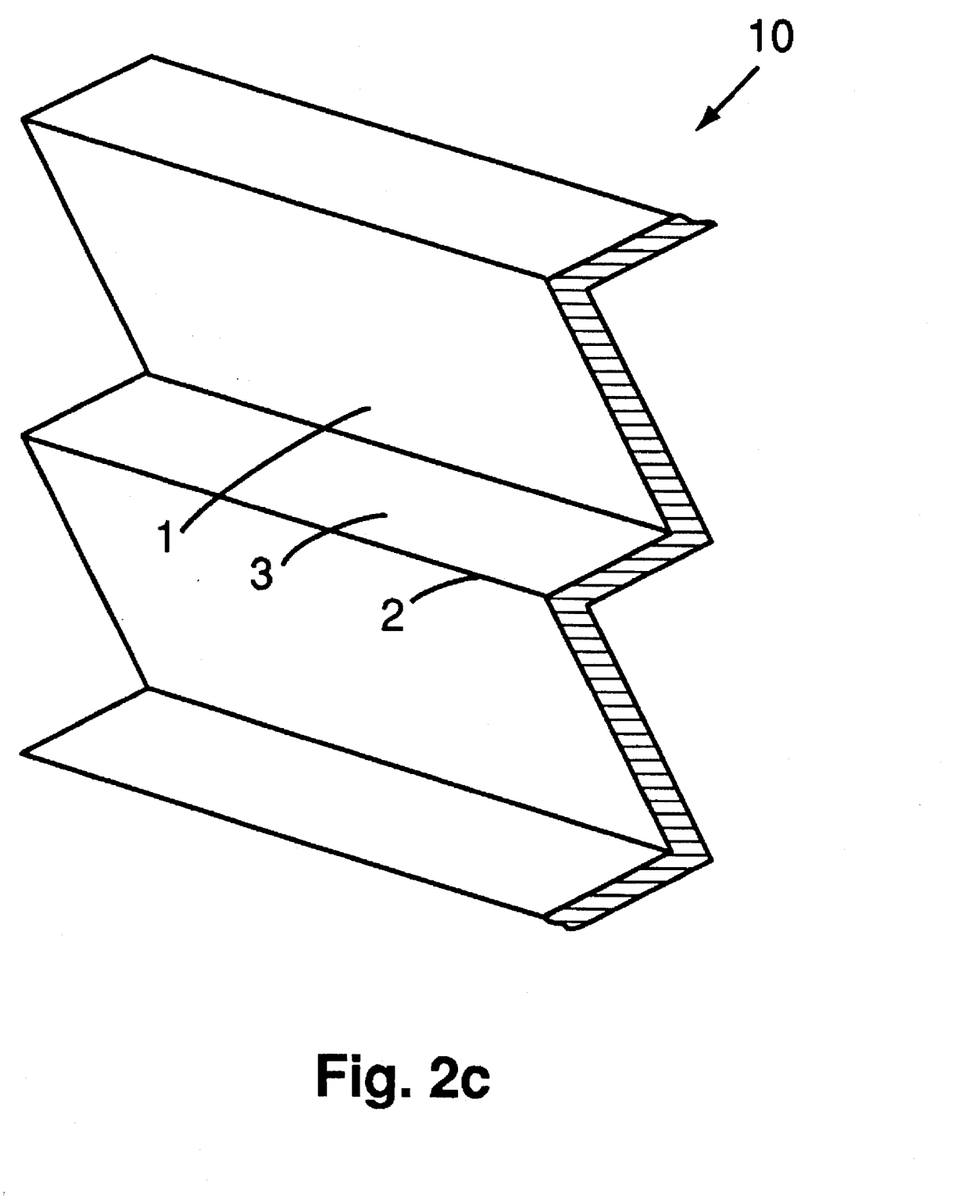
FIG. 2c is an oblique sectional view of the embodiment of the invention shown in FIGS. 2a and 2b.

Referring now to FIGS. 2a and 2b, for a structure 10 having an essentially vertical surface such as a wall, a first, absorptive surface 1 has a high solar radiation absorptivity at large angles of incidence, especially in the infrared range, and is at an angle of inclination B relative to the local vertical direction Y. A second, reflective surface 3 has a high reflectivity (low absorptivity) and is preferably perpendicular to first surface 1 forming about a 90 degree angle from the perspective of the source of solar radiation, as illustrated in the figures. The angle of inclination B is preferably selected to optimize the passive heating and cooling described below, preferably at or near B≅L to reflect solar radiation 30 in summer (A<L) and to absorb solar radiation 30 in winter (A >L). Hence, it is preferable to adapt the geometry according to latitude. The cyclic pattern 12 is extended horizontally, and duplicated vertically to form a pattern as shown in FIG. 2c.

Referring to FIG. 2a, the summer sun is high in the sky (A<L). The first surface 1 is shaded by overhang 2, and incoming solar radiation 30 is reflected by second surface 3 away from first surface 1, as illustrated by reflected rays 31, 32, 33, thereby minimizing absorption of solar radiation by the structure 10.

Referring to FIG. 2b, the winter sun is low in the sky (A>L), whereby first surface 1 is no longer shaded by overhang 2 and absorbs incoming solar radiation 30, as illustrated by ray 34, at a large angle of incidence $i_1$, typically >70°. Simultaneously, second surface 3 reflects additional solar radiation 30 toward first surface 1, as illustrated by reflected ray 35 which is absorbed, also at a large angle of incidence $i_2$. It is noteworthy that, by geometric construction, $i_1=i_2$, since first surface 1 and second surface 3 join at a right angle.

Winter solar radiation 30 arrives at first surface 1 at large angles of incidence $i_1$, $i_2$, for which many typical absorptive materials are not suitable due to low absorptivity at such angles. High absorptivity usually occurs at small angles relative to the surface normal. It is therefore preferable that first surface 1 incorporate surface features that increase solar radiation absorptivity at large angles of incidence. One means for accomplishing this is by forming microscopic spikes on first surface 1 that are generally normal to the surface. Solar radiation then will be at near-normal incidence to these spikes and will be readily absorbed. Such microscopic spikes are frequently found in oxide layers which typically have high absorptivities. Roughening the surface is another suitable means for adding such surface features. Other known means for increasing solar radiation absorptivity at large angles of incidence are also suggested.

Figure 3A:
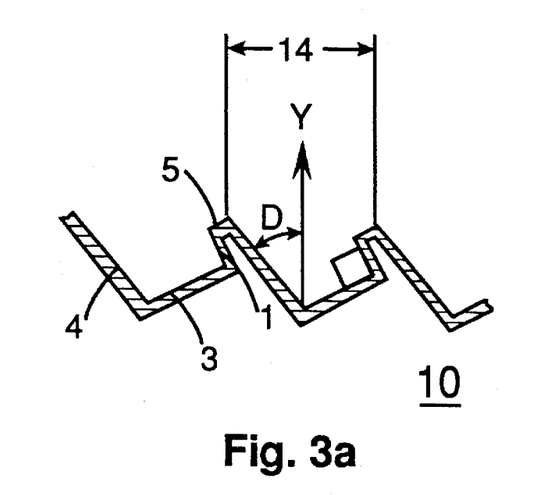
FIGS. 3a and 3b illustrate, in side cross sectional views, embodiments of the invention as applied to a horizontal surface and an inclined surface, respectively.
Figure 3B:
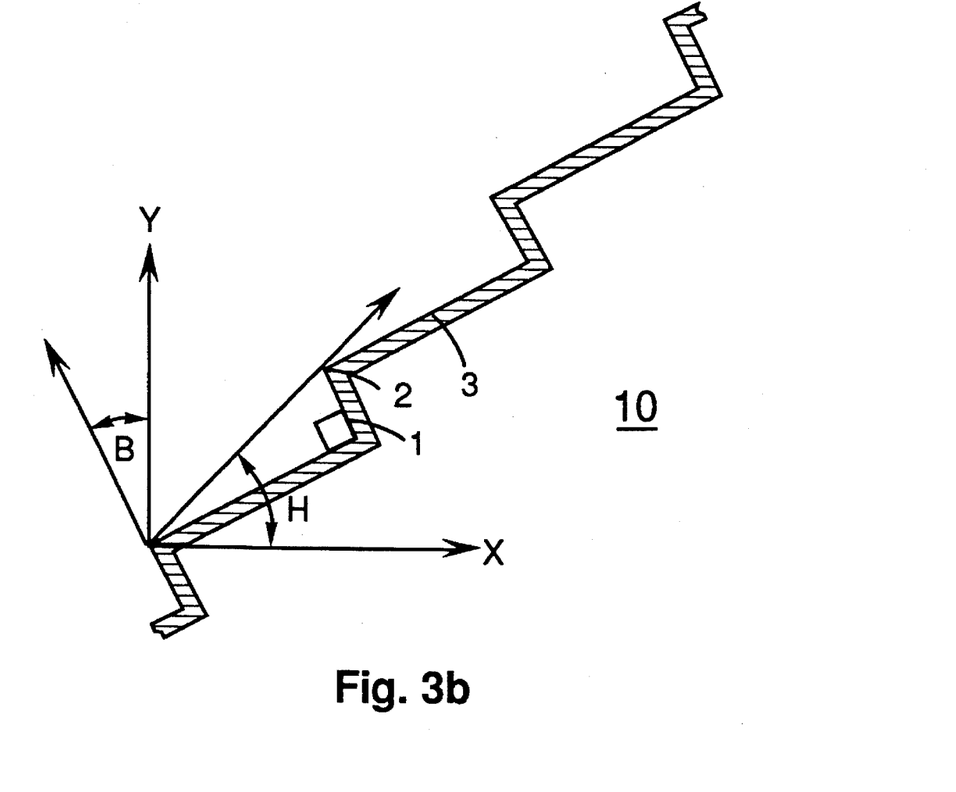

Moreover, the present invention is applicable to non-vertical surfaces such as inclined or flat (horizontal) roofs. For example, an essentially horizontal surface is shown in FIG. 3a, and an inclined surface is shown in FIG. 3b. Note, the addition of third and fourth offset surfaces 4, 5 in FIG. 3a.

Figure 4:
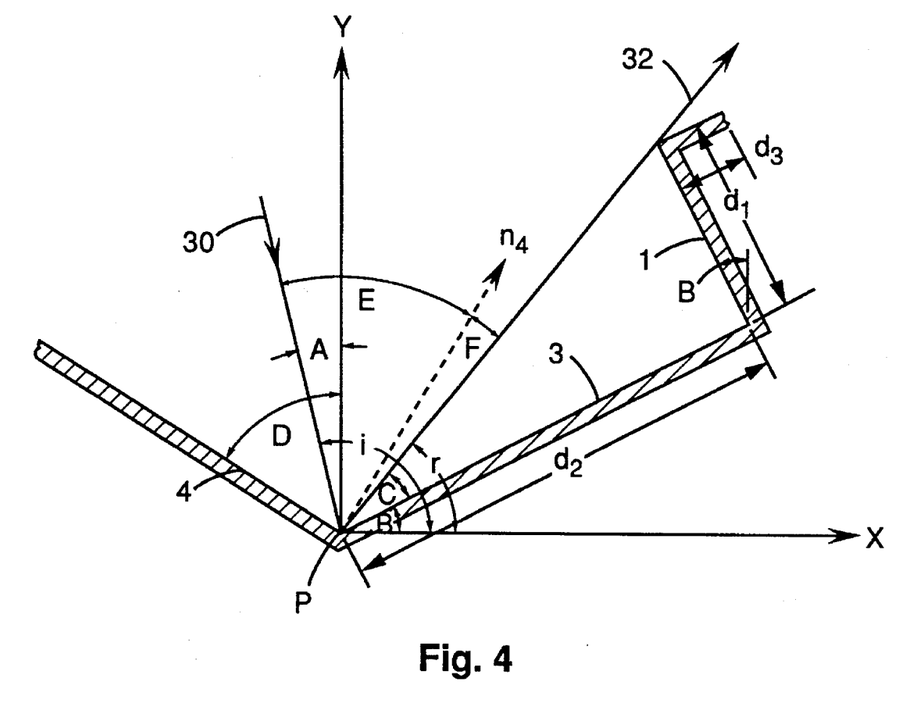
FIG. 4 illustrates, cross sectionally, a single cyclic pattern of the embodiment of the invention shown in FIG. 3b.

Referring also to FIG. 4, third surface 4 is reflective, and should be at an angle D, relative to vertical Y, whereby during winter, solar radiation 30 reaches first surface 1, D>L, and whereby during summer, solar radiation 30 reaching third surface 4 is reflected away from first surface 1. The angle D for this second condition is obtained at fall equinox (A=L) by noting that reflected solar radiation 32 subtends an angle C=arctan $(d_1/d_2)$ relative to second surface 3, so the angle of reflection is r=B+C, and the angle of incidence is $$i=90°+A=90°+L$$

noting that $d_1$ and $d_2$ are the lengths of surfaces 1 and 3, respectively. The normal $n_4$ to third surface 4 is located midway between the angle of incidence i and the angle of reflection r, because E=F for reflections. Thus, the normal $n_4$ to third surface 4 lies at an angle relative to horizontal of $$0.5(i+r)=0.5(B+C+L+90°)=45°+0.5(B+C+L)$$

Moreover, the angle of $n_4$ relative to horizontal is the same as the angle D of third surface 4 relative to vertical, by construction.

$$D≧45°+0.5(B+C+L).$$

A combination of these two conditions yields $$D≧max\{L, 45°+0.5[B+L+arctan (d_1/d_2)]\}.$$

This last equation can be generalized for a non-horizontal surface at an angle H relative to the horizontal, as shown in FIG. 3b, $$D>max\{L, 45°+0.5[H+B+L+arctan(d_1/d_2)]\}.$$

As the angle H is increased from zero in FIG. 3b, the angle of third surface 4 relative to the vertical Y increases until third surface 4 merges with second surface 3, at which point the embodiment shown FIG. 3b becomes like that shown in FIG. 3a.

Connecting surface 5, shown in FIG. 3a is preferred in order to preclude a very narrow and pointed structure that terminates at overhang 2, which would be difficult to fabricate, and perhaps result in structural weakness. In any case, the length $d_3$ of connecting surface 5 should usually be minimized.

Figure 5A:
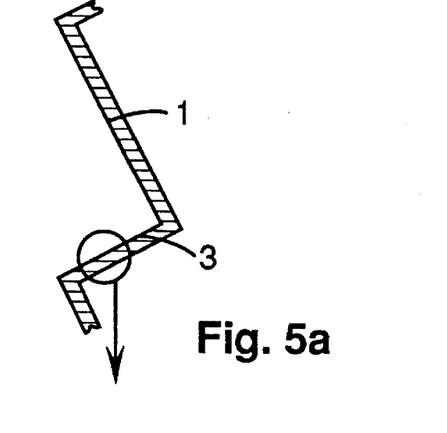
FIGS. 5a, 5b, and 5c illustrate, in side cross sectional views, consecutively smaller scale production of cyclic patterns on reflective surfaces of the embodiment of the invention shown in Figs. 2a and 2b.
Figure 5B:
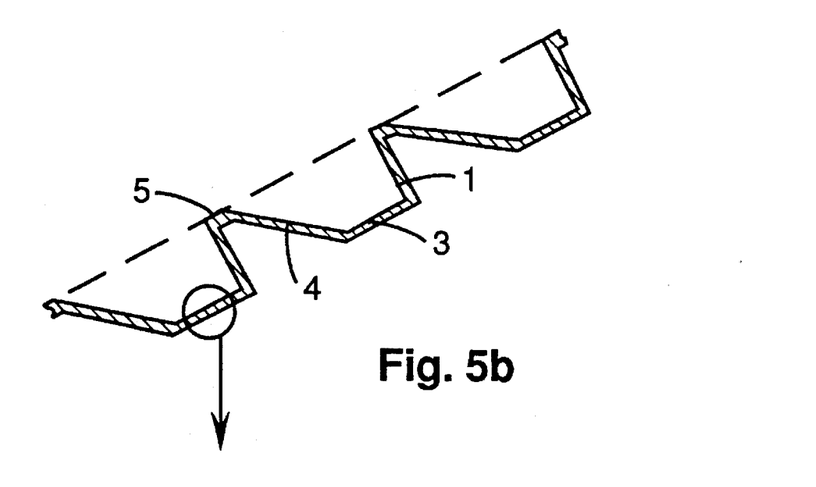
Figure 5C:
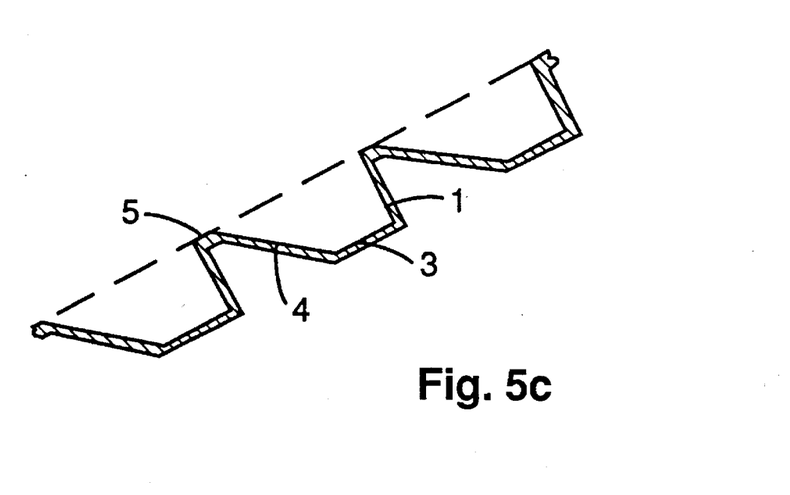
Figure 6A:
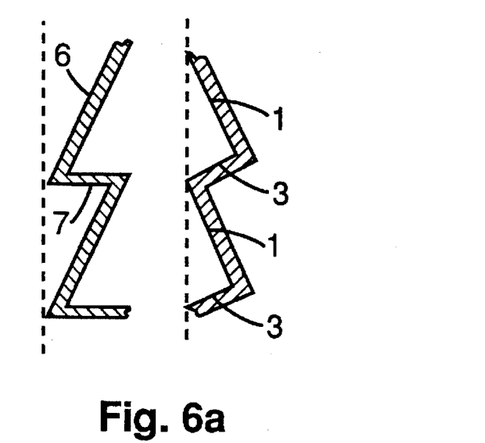
FIGS. 6a, 6b, 6c and 6d illustrate, cross sectionally, various embodiments of the invention having protective overlayers.
Figure 6B:
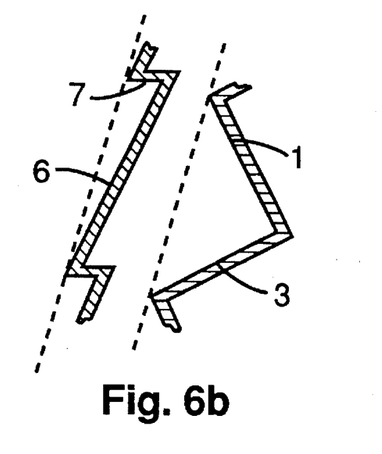
Figure 6C:
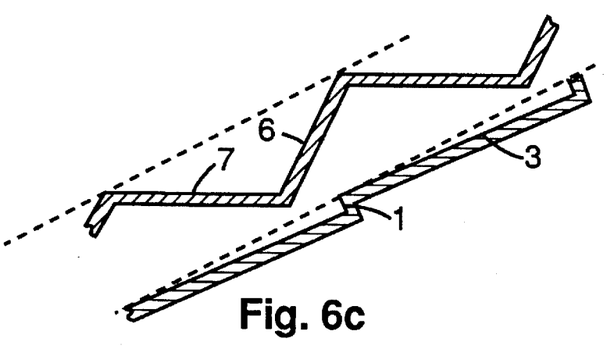
Figure 6D:
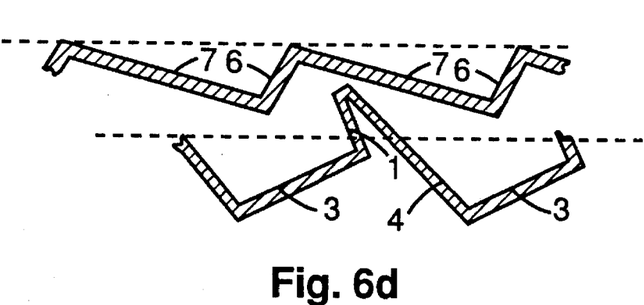

In many cases, a portion of the reflected winter solar radiation from second surface 3 does not reach first surface 1, but is reflected away and lost, as shown, for example, in FIG. 2b by rays 36. This inefficiency can be reduced by smaller scale production of cyclic patterns on surfaces 3 and 5, as shown in FIG. 5, which allows increased solar radiation absorption in winter, while maintaining solar radiation reflection in summer. Self-similar repetition, ad infinitum, of the cyclic pattern 14 would produce a mathematically fractal surface. In practice, the smallest dimension d of this structure, $d=max(d_1, d_2, ...)$, is limited by diffraction effects at infrared wavelengths λ having a range $$7.8×10^{-7}m≦λ≦10^{-4}m$$

or $$d≧10\ λ=10^{-3}m=1\ millimeter.$$

Larger (e.g.≧5 mm) surface structures can be formed directly into building surface structural materials by molding, rolling, pressing machining, or other conventional methods. Smaller (e.g.<5 mm) surface structures can be formed on easily installed surface panels by ion implantation, chemical growth, chemical etching, or other conventional methods. Subsequently, surface coating(s) can be applied directionally, by ion implantation, electrostatic spraying, chemical vapor deposition, sputtering, or other conventional methods, to the formed surface in order to produce the appropriate reflection/absorption properties as described hereinabove. The invention can be practiced using a straight-forward extension of present micro-electronic fabrication techniques (micrometer-size structures on chips of $1-10^3$ square centimeters, or $<10^8$ structures/cm$^2$) to large structures ($\geq 1$ millimeter) on large surface areas ($\geq 1$ square meter) or $\leq 10^6$ structures/m$^2$. The surface design parameters include the structure size, shape (as above), orientation (as above), and material composition.

The invention can be applied to vertical, inclined and/or horizontal surfaces on the same building to achieve maximum effect. Embodiments of the invention can be designed for use on non-planar (i.e. concave, convex) surfaces. Such applications require the adaptation of each cyclic pattern 12 to the orientation of the particular portion of the curved surface which it will occupy. Conventional computer aided design techniques can be adapted to accomplish such complex design work.

In the present invention, conductive and convective heat transfer between the air and the passive solar surface can be reduced by overlaying the surface with a transparent, protective material with a low thermal conductivity. Such an overlayer is also desirable to protect the surface structures from dirt, damage and deleterious effects of weather. However, total external reflection can occur if the protective material absorbs a significant portion of incoming solar radiation, deleteriously affecting operation of the invention. If the protective material is very absorptive (e.g., conducting metals) the external reflection is nearly total for all angles of incident radiation. The preferred protective material is very slightly absorbing (e.g., plastics such as polyethylene), for which the angle for total external reflection is close to 90°. For less preferred materials having intermediate absorptivities, the angle for total external reflection takes a value between 0° and 90°.

Figure 7:
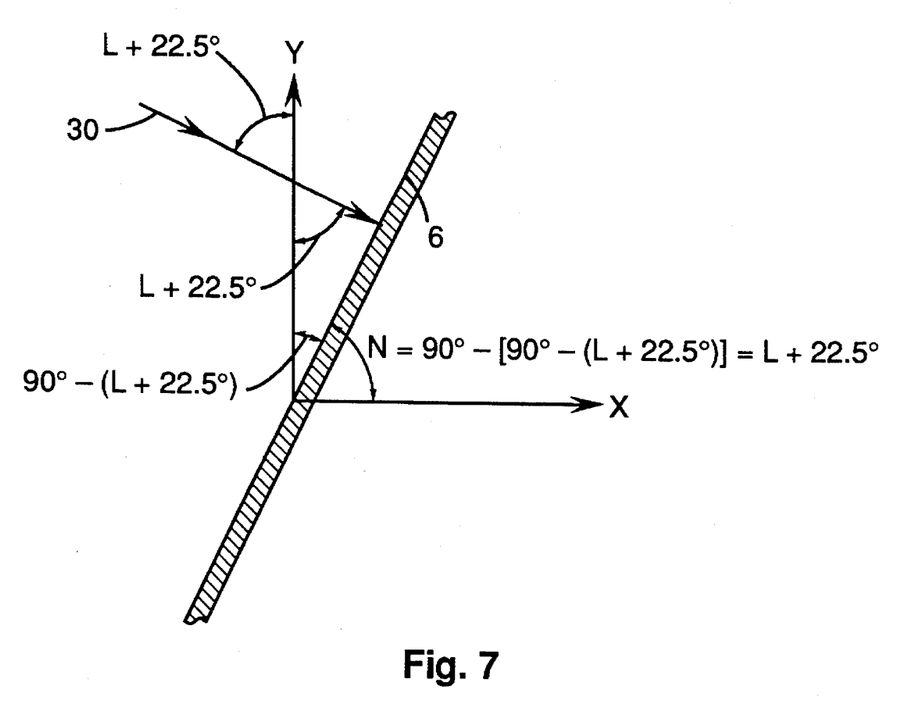
FIG. 7 illustrates, cross sectionally, a first surface of a protective overlayer.
Figure 8:
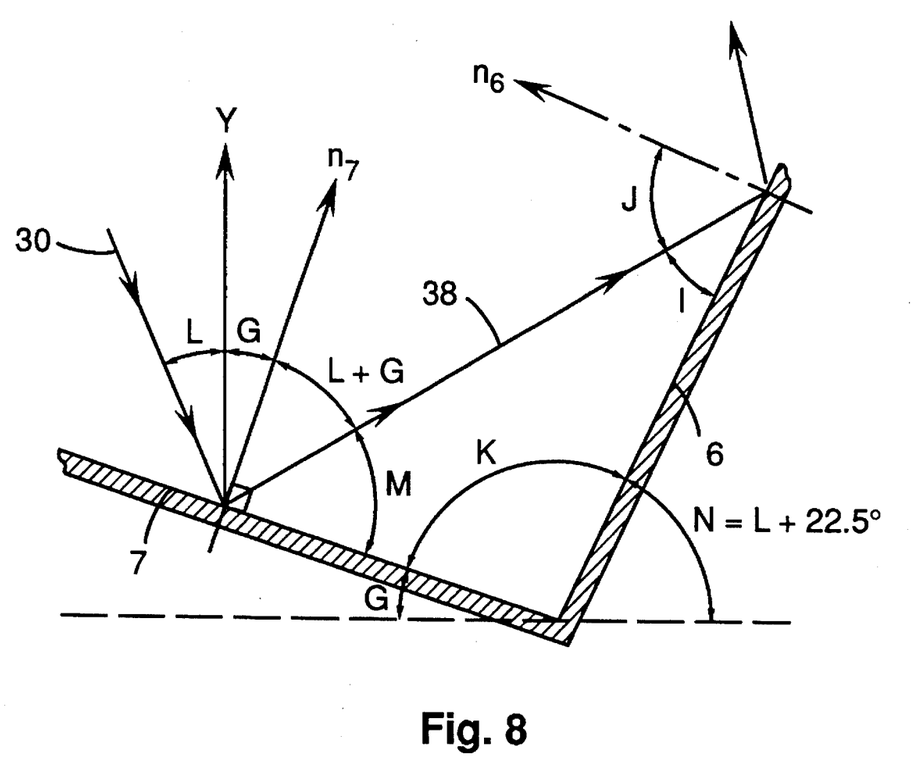
FIG. 8 illustrates, cross sectionally, first and second surfaces of a protective overlayer.

Consequently, the present invention employs external surface contours for the protective layer as shown in FIG. 6 to increase heat transmissivity during the winter by near normal incidence to the surface of the protective material, which has a finite absorption of solar radiation. First protective surface 6 is selected to be normal to solar radiation 30 at the winter solstice as shown in FIG. 7, for which the angle N has a value N=L+22.5°. As shown in FIG. 8, incoming summer solar radiation 30 can be reflected from second protective surface 7, illustrated by ray 38, reaching first protective surface 6, and subsequently can be absorbed by first surface 1, thus defeating the scheme shown in FIG. 2. This situation is corrected by setting the angle G of second protective surface 7 in FIG. 6d to produce total external reflection of ray $R_1$ from first protective surface 6. The geometry is shown in FIG. 8, corresponding to the spring equinox when the sunlight arrives at an angle L relative to the vertical direction. Summer sunlight arrives at an angle A of A$\leq$L, so A=L is sufficient to exclude all summer sunlight by total external reflection. Referring to FIG. 8, the angle of incidence for solar radiation 30 is L+G relative to the normal $n_7$ to second protective surface 7, so the angle of reflection for ray 38 is also L+G. The angle M is M=90°−(L+G), and the angle K is K=180°−G−N. Thus, the angle I is I=180°−M−K=180°−(180°−G−N)−[90°−(L+G)], or I=2G+N+L−90°. The angle of incidence of ray 38 on first protective surface 6 is J=90°−I=90°−(2+G+N+L− 90°)=180°−2G−N−L. For total external reflection, angle J must be no less than the angle Θ for total external reflection for the protective absorbing material, depending the properties of the protective material. The following references provide further information on determining Θ:

1. M. B. Kraichman, *Handbook of Electromagnetic Propagation in Conducting Media*, U.S. Government Printing Office, Washington, D.C. (1970) pp. 2–1 to 2–8. See also references cited therein.
2. E. U. Condon, H. Odishaw (eds.), *Handbook of Physics*, McGraw-Hill Book Co., 2nd edition (1967) pp. 6–7 to 6–9. See also references cited therein.

The angle J is selected to be equal to Θ to achieve total external reflection during the summer, and to allow the entry of winter sunlight for solar heating. This condition is obtained from:

$$J=180°-2G-L-N=180°-2G-L-(L+22.5°)=157.5°-2G-2L\geq\Theta$$

which can be solved for the angle G as:

$$G\leq 77.75°-L-\Theta/2.$$

Sunlight refraction effects change the optimal orientation of the surfaces if they are in intimate contact with the protective layer, but are easily compensated by using Snell's law of refraction: $n_{air}\sin A=n_{prot}\sin A'$. Here $n_{air}$ and $n_{prot}$ are the indices of refraction for air (nominally 1) and the protective material, respectively. The angle A is given in FIG. 1 as the angle of incidence of sunlight relative to the surface normal on the solar panel external surface. The angle A' is the angle of refraction of the solar radiation within the protective material, and is the apparent angle of solar incidence at the interface between the protective layer and the passive solar surface, $A'=\arcsin(\sin A/n_{prot})$. The formulas set forth herein above then apply with the angle A replaced by A'.

An air gap between the protective layer and the surface structure is an alternative embodiment of this invention and does not involve this correction for apparent angle of incidence. Moreover, this alternative embodiment allows an air gap for convective thermal isolation of the passive surface.

Moreover, the present invention can be adapted to provide passive, solar heating and cooling over a daily solar cycle. One embodiment uses a material for first surface 1 that has a high absorptivity below some selected temperature $T_1$, and a low absorptivity (=low emissivity) above $T_1$. In addition, the protective material has low infrared transmissivity below some temperature $T_2$ and a high transmissivity above $T_2$. For $T_2<T_1$, this embodiment reduces radiative cooling of the surface during very cold weather, because $T<T_2$ reduces the protective layer transmissivity, reduces radiative heating by scattered radiation during hot days ($T>T_1$) due to reduced absorptivity of first surface 1, and allows solar heating over an optimally selected temperature range $T_2<T<T_1$.

Another embodiment adapted to provide passive, solar heating and cooling over a daily solar cycle uses a material for first surface 1 that has a low absorptivity below some selected temperature $T_1$, and a high absorptivity (=low emissivity) above $T_1$. The protective material has high infrared transmissivity below some temperature $T_2$ and a low transmissivity above $T_2$. For $T_1<T_2$, this embodiment reduces radiative cooling of the surface during very cold weather ($T<T_1$) due to reduced emissivity of first surface 1, reduces radiative heating by scattered radiation during hot days ($T>T_2$) due to reduced protective material transmissivity, and allows solar heating over an optimally selected temperature range $T_1<T<T_2$. Moreover, the upper temperature limit should balance (a) radiative cooling of the hot surface by the cool summer nighttime sky with (b) reduced absorption of scattered radiation during hot days. The lower temperature limit must balance (c) the reduction radiative heat loss in very cold weather with (d) adequate solar heating during winter. The lower temperature limit is generally in the range of about 50° F. to about 70° F., preferably in the range of about 55° F. to about 65° F., most preferably about 60° F. The upper temperature limit is generally in the range of about 70° F. to about 90° F., preferably in the range of about 75° F. to about 85° F., most preferably about 80° F.

The invention thus provides various advantages, including: solar radiation absorptivity enhancement during winter; solar radiation reflectivity enhancement during summer; reduced absorption of scattered summer solar radiation during hot days; heat retention enhancement (emissivity reduction) during cold weather; applicability to vertical/inclined walls and to inclined/horizontal roof surfaces; and, surface panel installation to retrofit existing energy-inefficient buildings.

Surfaces for passive solar radiation reflection and absorption have a variety of applications in addition to passive solar heating and shading of buildings. Such applications include satellites for which solar heating and shading must vary with the angle of incidence of solar radiation, and industrial applications that require radiative shading or heating of components according to the angle of incidence.

While there has been shown and described what are at present considered the preferred embodiments of the invention, it will be obvious to those skilled in the art that various changes and modifications can be made therein without departing from the scope of the inventions defined by the appended claims.

What is claimed is:

1. An article adapted for selectively utilizing solar radiation in correspondence with a seasonal cycle comprising an essentially planar, overhanging, absorptive surface having a lower edge, said absorptive surface adapted for absorbing solar radiation at large angles of incidence, and an essentially planar reflective surface having an inner edge adjoining said lower edge of said absorptive surface at an adjoining angle in the range of from about 83° to about 97° from the perspective of the source of solar radiation, said reflective surface oriented to reflect solar radiation toward said absorptive surface during a winter season, and to reflect solar radiation away from said absorptive surface during a summer season.

2. An article in accordance with claim 1 wherein said adjoining angle is in the range of from about 88° to about 92°.

3. An article in accordance with claim 2 wherein said adjoining angle is about 90°.

4. An article in accordance with claim 1 wherein said absorptive surface and said reflective surface are further oriented in relation to a geographical location of said article.

5. An article in accordance with claim 1 wherein said absorptive surface and said reflective surface are protected by a protective transparent overlayer structure, said overlayer structure adapted to minimize interference thereof with operation of said article.

6. An article in accordance with claim 1 wherein said reflective surface is characterized by a plurality smaller secondary absorptive and reflective surfaces oriented in like manner, in fractal fashion.

7. An article in accordance with claim 1 wherein said article further comprises means for selectively utilizing solar radiation in correspondence with a daily cycle.

8. An article in accordance with claim 1 wherein said surfaces are arranged so that said article is suitable for use in at least one of: a vertical orientation, an inclined orientation and a horizontal orientation.

* * * * *